(12) United States Patent
Ozawa

(10) Patent No.: US 12,206,312 B2
(45) Date of Patent: Jan. 21, 2025

(54) MOTOR AND MANUFACTURING METHOD OF THE SAME

(71) Applicant: Robert Bosch GmbH, Stuttgart (DE)

(72) Inventor: Kouichi Ozawa, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 442 days.

(21) Appl. No.: 17/603,035

(22) PCT Filed: Mar. 6, 2020

(86) PCT No.: PCT/IB2020/051963
§ 371 (c)(1),
(2) Date: Oct. 12, 2021

(87) PCT Pub. No.: WO2020/208437
PCT Pub. Date: Oct. 15, 2020

(65) Prior Publication Data
US 2022/0200393 A1    Jun. 23, 2022

(30) Foreign Application Priority Data

Apr. 12, 2019 (JP) ................................. 2019-076591

(51) Int. Cl.
*H02K 7/08* (2006.01)
*B23P 19/02* (2006.01)
(Continued)

(52) U.S. Cl.
CPC ............ *H02K 5/1732* (2013.01); *B23P 19/02* (2013.01); *F04B 17/03* (2013.01); *F16C 17/26* (2013.01); *H02K 7/083* (2013.01); *H02K 15/14* (2013.01)

(58) Field of Classification Search
CPC ............ H02K 1/04; H02K 1/14; H02K 1/146; H02K 1/16; H02K 1/165; H02K 1/18;
(Continued)

(56) References Cited

U.S. PATENT DOCUMENTS 6,215,215 B1 *  4/2001  Huber ..................... F04B 53/16
                                                              310/86
6,420,811 B1    7/2002  Wetzel
(Continued)

FOREIGN PATENT DOCUMENTS

CN       207353962 U    5/2018
EP        1335478 A1    8/2003
(Continued)

OTHER PUBLICATIONS

International Search Report and Written Opinion for Application No. PCT/IB2020/051963 dated May 4, 2020 (9 pages).

*Primary Examiner* — Bryan R Perez
(74) *Attorney, Agent, or Firm* — Michael Best & Friedrich LLP

(57) ABSTRACT

[Problem] To provide a motor and a manufacturing method of the motor capable of suppressing generation of creep noise.
[Means for Resolution] A motor (49) that drives piston pumps (45, 48) according to the invention of the present application includes: a motor housing (61); an output rotary shaft (50); a first bearing (66) that supports the output rotary shaft (50) and is arranged on a side of the piston pumps; a second bearing (67) that supports one end of the output rotary shaft (50) and is arranged on a side of a bottom portion (72) of the motor housing (61); and a bearing holder (80, 90) that is held by an inner wall of the motor housing (61) so as to hold the second bearing (67).

5 Claims, 5 Drawing Sheets

(51) Int. Cl.
*F04B 17/03* (2006.01)
*F16C 17/26* (2006.01)
*H02K 5/173* (2006.01)
*H02K 15/14* (2006.01)

(58) Field of Classification Search
CPC .......... H02K 1/185; H02K 3/34; H02K 3/345; H02K 3/38; H02K 3/18; H02K 3/46; F04B 17/03; F04B 9/045; B60T 8/4022; B60T 8/368
See application file for complete search history.

(56) References Cited

U.S. PATENT DOCUMENTS

| | | |
|---|---|---|
| 2001/0017495 A1 | 8/2001 | Sato et al. |
| 2004/0020358 A1* | 2/2004 | Siegel .................... H02K 7/083 |
| | | 92/72 |
| 2019/0301459 A1* | 10/2019 | Maeda ................ F04C 18/0215 |

FOREIGN PATENT DOCUMENTS

| | | |
|---|---|---|
| JP | H10339323 A | 12/1998 |
| JP | 2009296811 A | 12/2009 |
| JP | 2016142234 A | 8/2016 |

* cited by examiner

[FIG. 1]
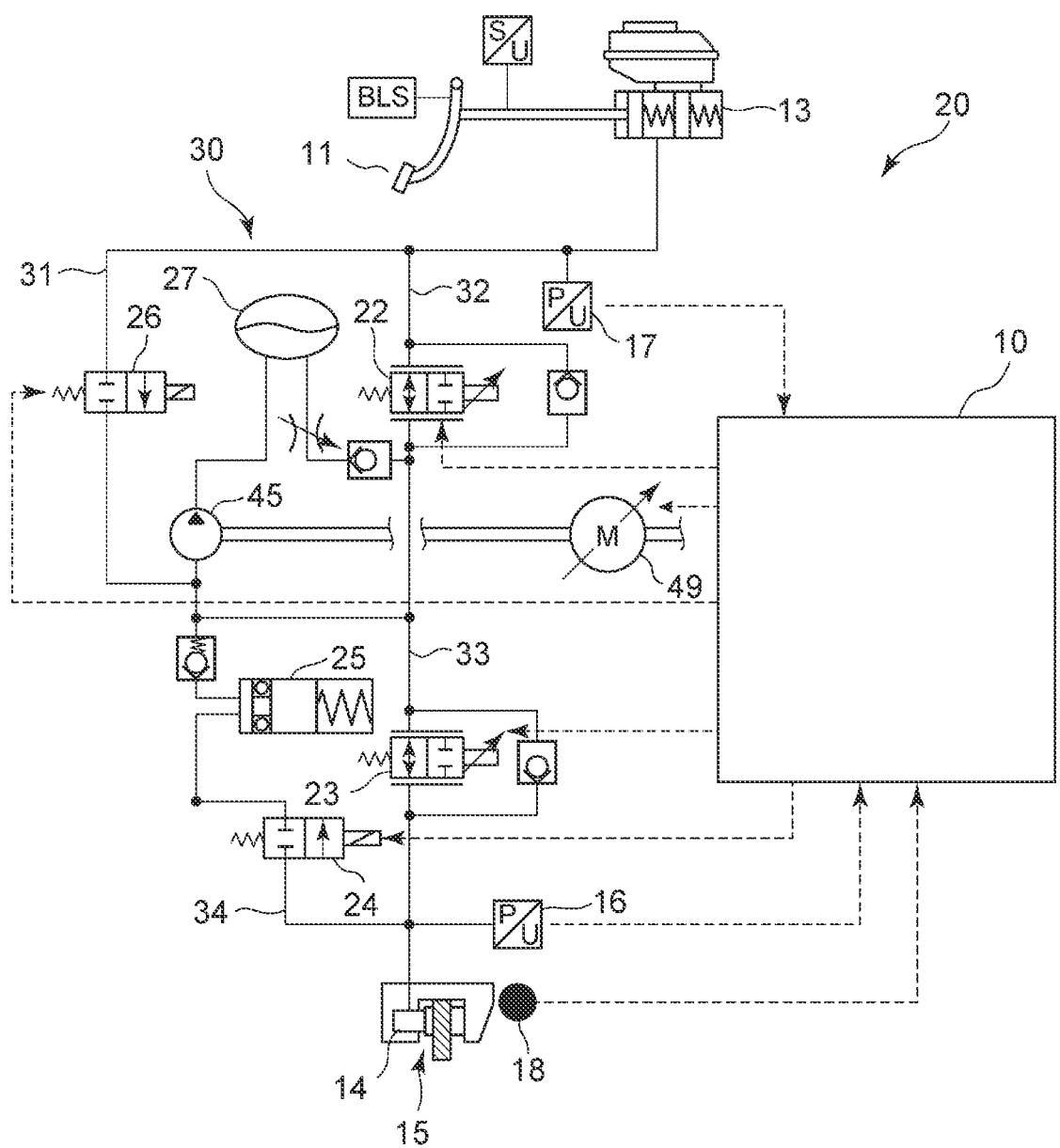

[FIG. 2]
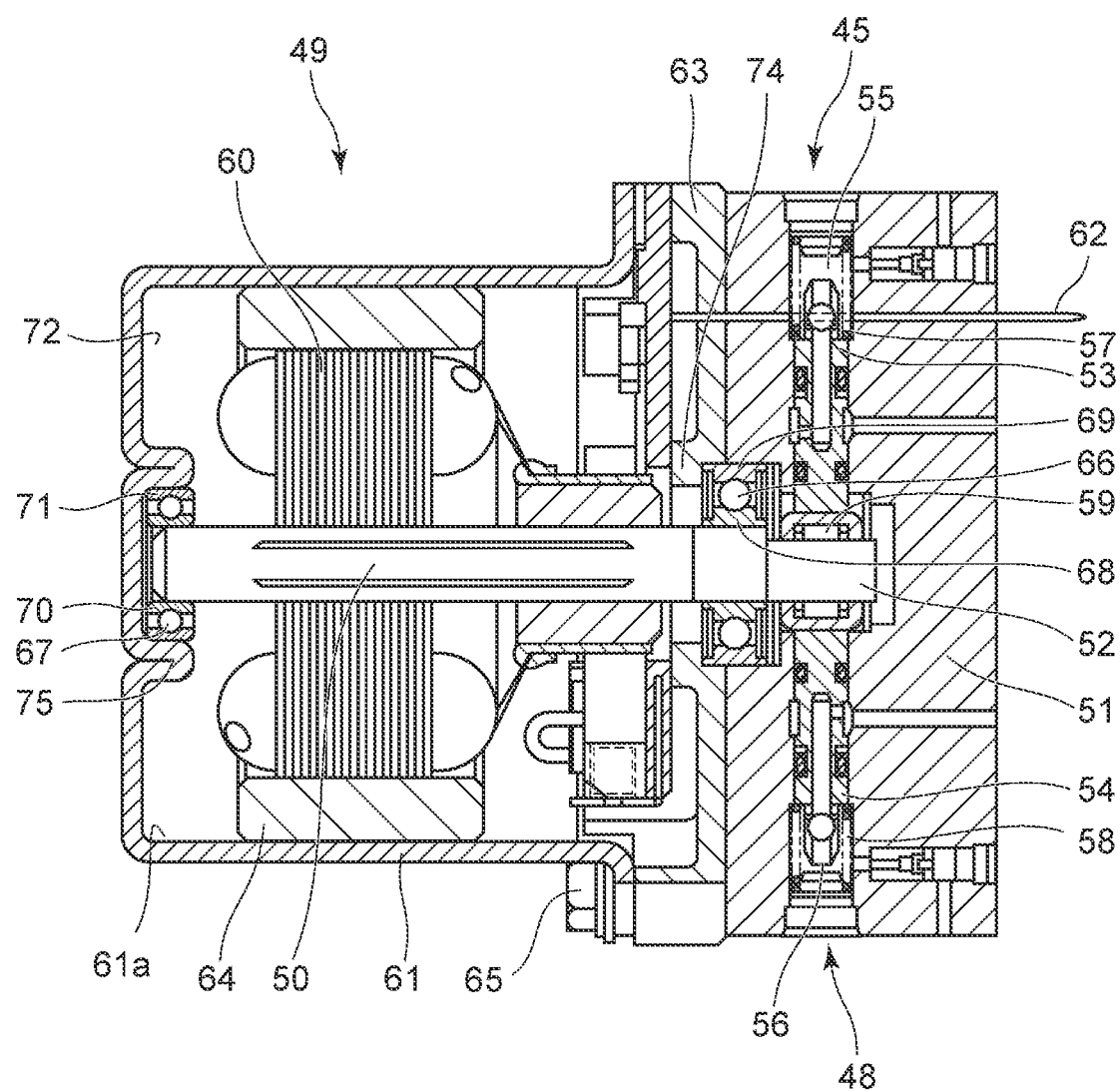

[FIG. 3]
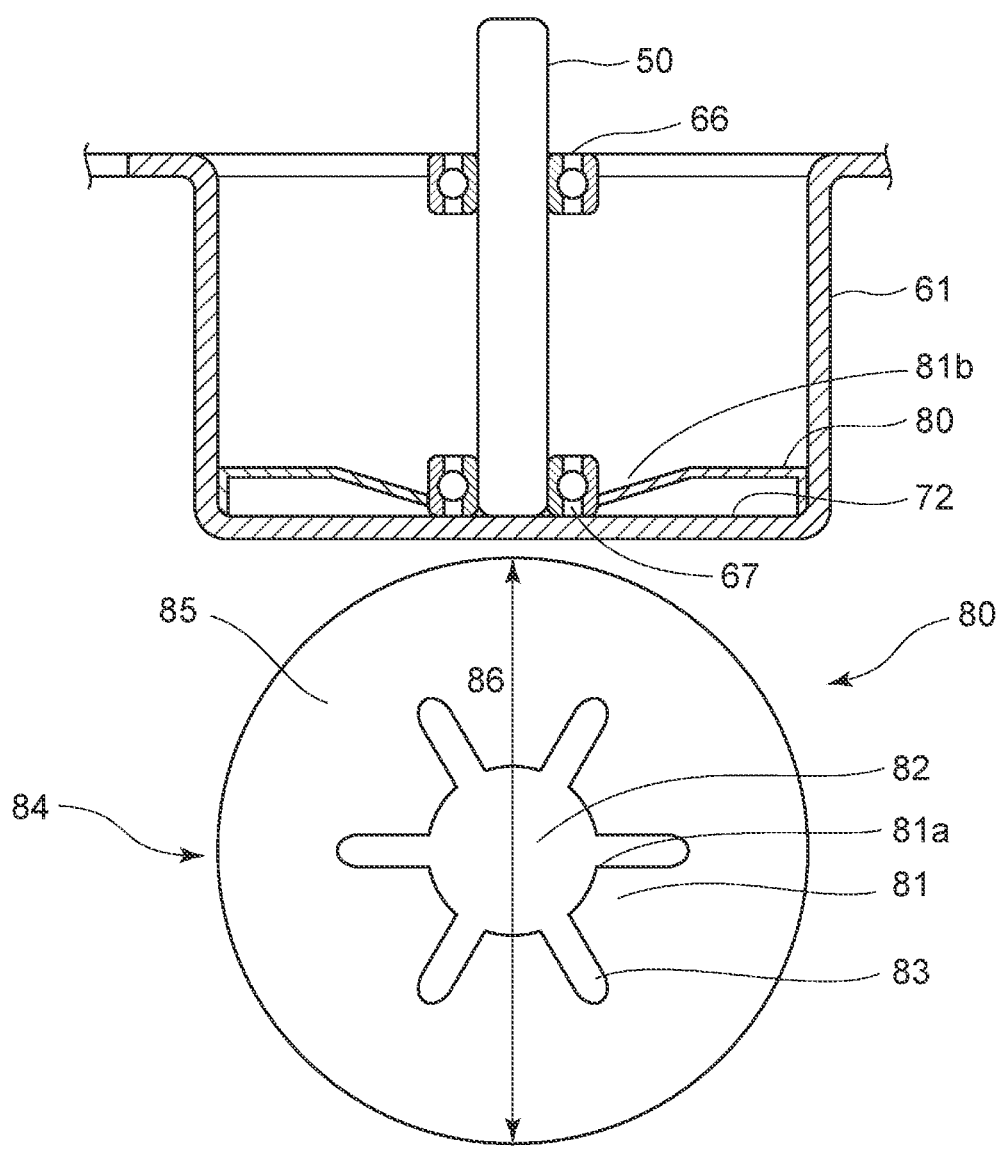

[FIG. 4]
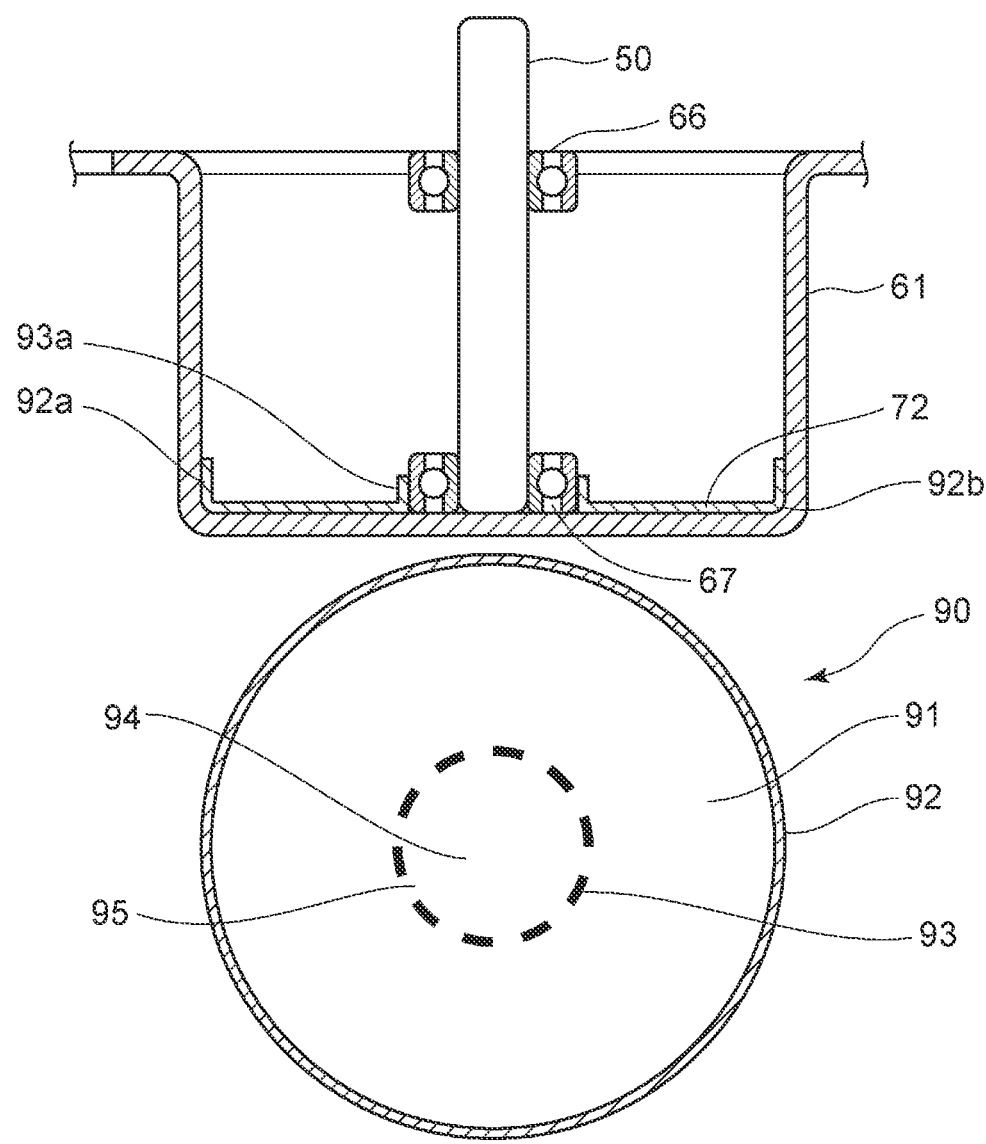

[FIG. 5]
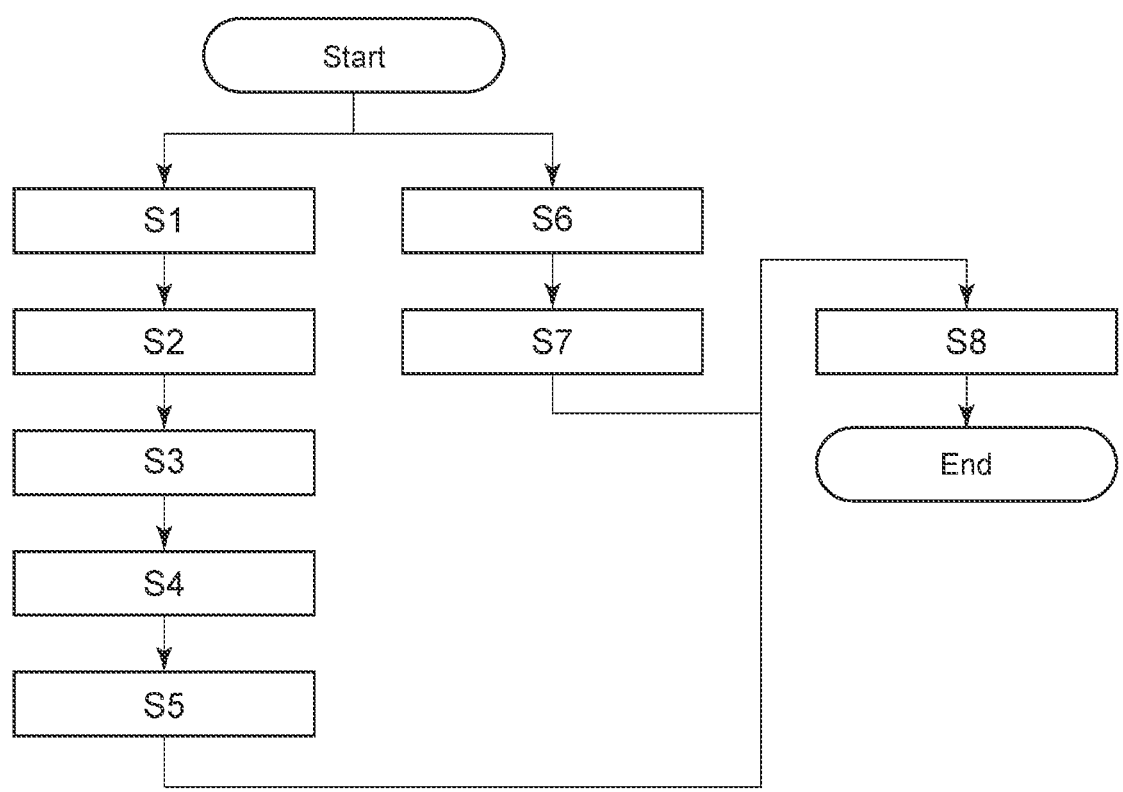

MOTOR AND MANUFACTURING METHOD OF THE SAME

BACKGROUND OF THE INVENTION

The present invention relates to a motor, an output rotary shaft of which is at least supported by bearings at two positions, and a manufacturing method of the motor, and, in particular, relates to a motor for driving a piston pump and used in a vehicle brake hydraulic pressure control apparatus or the like.

As motors of this type for driving a piston pump, motors having various configurations have been known. A vehicle brake hydraulic pressure control apparatus that is used widely includes: a valve that opens/closes a communication passage between a brake master cylinder and a wheel brake cylinder; a valve that opens/closes a communication passage between a reservoir and a wheel cylinder; a piston pump that pressure-feeds a brake fluid in an accumulator to one of the brake master cylinder and the wheel cylinder; and a motor that drives this piston pump. Such a vehicle brake hydraulic pressure control apparatus is disclosed in JP-A-2016-142234. In the vehicle brake hydraulic pressure control apparatus disclosed in JP-A-2016-142234, two positions of a lower end portion of an output rotary shaft of a motor and a portion near an opening of a motor housing are each supported by a ball bearing. Of the two ball bearings, the ball bearing that is disposed near the piston pump (hereinafter, a first bearing) supports the opening portion of the motor housing using a case member. The other ball bearing (hereinafter, a second bearing) is disposed in a cup-shaped portion that is formed in a bottom portion of the motor housing and is opened to an internal space of the housing.

SUMMARY OF THE INVENTION

In the vehicle brake hydraulic pressure control apparatus disclosed in JP-A-2016-142234, due to the structure thereof, after the second bearing is press-fitted into and held by an inner wall of the cup-shaped portion, the output rotary shaft has to be fitted to an inner ring of the second bearing. For this reason, the second bearing cannot press-fit and fix the output rotary shaft in advance, and the output rotary shaft is fitted to the inner ring of the second bearing in a state of having a clearance therebetween. That is, a pre-load is not applied to the second bearing. Thus, when a rotational frequency difference occurs between the inner ring of the second bearing and the output rotary shaft, vibrations and noise, which are so-called creep noise, are generated.

The present invention has been made with a problem as described above as the background, and therefore has a purpose of providing a motor for driving a radial pump and a manufacturing method of the motor in which a second bearing can press-fit and be fixed to an output rotary shaft, so as to be able to suppress vibrations generated by the motor output rotary shaft while the pump is driven.

A motor that drives piston pumps according to the invention of the present application includes: a motor housing; an output rotary shaft; a first bearing that supports the output rotary shaft and is arranged on a side of the piston pumps; a second bearing that supports one end of the output rotary shaft and is arranged on a bottom portion side of the motor housing; and a bearing holder that is held by an inner wall of the motor housing so as to hold the second bearing.

A manufacturing method of a motor according to the invention of the present application in which an output rotary shaft of the motor driving a piston pump is at least supported by two points that are a first bearing arranged on the piston pump side and a second bearing arranged on a bottom portion of a motor housing includes: press-fitting and fixing the output rotary shaft into the second bearing; press-fitting and fixing a bearing holder that holds the second bearing into the motor housing; and press-fitting and fixing the second bearing that has press-fitted and fixed the output rotary shaft therein into the bearing holder.

In the motor and the manufacturing method of the motor according to the present invention, the output rotary shaft is press-fitted and fixed into the two bearings, and the bearing holder that is supported by the motor housing holds the second bearing from an outer side. As a result, it is possible to suppress generation of vibrations and noise at the time when the piston pump is actuated.

BRIEF DESCRIPTION OF THE DRAWINGS

FIG. 1 is a schematic configuration view of a vehicle brake hydraulic pressure control apparatus according to an embodiment of the present invention.

FIG. 2 is a view for illustrating exemplary internal structures of a motor and a piston pump.

FIG. 3 is a view for illustrating an example of the motor according to the embodiment of the present invention.

FIG. 4 is a view for illustrating another example of the motor according to the embodiment of the present invention.

FIG. 5 is a flowchart illustrating a manufacturing method of the motor according to the embodiment of the present invention.

DETAILED DESCRIPTION

A description will hereinafter be made on a motor and a manufacturing method of the motor according to the present invention with reference to the drawings. A configuration, operation, and the like, which will be described below, constitute merely one example, and the motor and the manufacturing method thereof according to the present invention are not limited to a case with such a configuration, such operation, and the like.

In addition, in each of the drawings, detailed portions will appropriately be simplified or will not be illustrated. An overlapping description will appropriately be simplified or will not be made.

Description on Configuration of Vehicle Brake Control System

FIG. 1 illustrates a brake control system 20, and only illustrates a brake system for one wheel in a hydraulic circuit of a brake system for four wheels. In FIG. 1, the brake control system 20 is applied to the brake system that increases a brake pedal depression force by a driver without using a booster and transmits the increased depression force to a wheel cylinder. However, the booster may be used in an example of the brake system.

The brake control system 20 has four of first to fourth hydraulic circuits. Because each of the second to the fourth hydraulic circuits has the same configuration as the first hydraulic circuit, the second to the fourth hydraulic circuits are not illustrated in FIG. 1. The wheel cylinders for four wheels are supplied with a brake fluid from a master cylinder 13 via the first to fourth hydraulic circuits, respectively.

A first hydraulic circuit 30 includes a pump 45 that is driven by a motor 49. The first hydraulic circuit 30 also includes an accumulator 25 and a damper 27.

The pump 45 is driven by the motor 49 and discharges the brake fluid. Driving of the motor 49 is controlled by a brake electronic control unit 10.

A pipeline that communicates with the master cylinder 13 is provided with a first pressure sensor 17. The first pressure sensor 17 detects an internal pressure of the master cylinder 13.

A pipeline that communicates with a wheel cylinder 14 in a hydraulic brake 15 for the wheel is provided with a second pressure sensor 16. The second pressure sensor 16 detects an internal pressure of the wheel cylinder 14.

The first hydraulic circuit 30 includes a plurality of electromagnetic control valves. The electromagnetic control valves include: a circuit control valve 22 of a normally-open type that can be controlled linearly; a suction control valve 26 of a normally-closed type that is subjected to on/off control; a booster regulator 23 of the normally-open type that can be controlled linearly; and a pressure regulator 24 of the normally-closed type that is subjected to the on/off control.

The circuit control valve 22 is arranged in a channel 32 that connects the master cylinder 13 and a discharge side of the pump 45. The circuit control valve 22 can be controlled linearly, and continuously regulates an area of a channel between the master cylinder 13 and the booster regulator 23.

The suction control valve 26 is arranged in a channel 31 that connects the master cylinder 13 and a suction side of the pump 45. The suction control valve 26 communicates between the master cylinder 13 and the suction side of the pump 45, or blocks the communication between the master cylinder 13 and the suction side of the pump 45.

The booster regulator 23 is arranged on a channel 33 that connects the circuit control valve 22 and the wheel cylinder 14. The booster regulator 23 can be controlled linearly, and continuously regulates a flow rate of hydraulic oil from a side of the master cylinder 13 and the circuit control valve 22 to a side of the wheel cylinder 14 in the hydraulic brake 15 for the wheel.

The pressure regulator 24 is arranged in a channel 34 that connects the suction side of the pump 45 and the wheel cylinder 14. The pressure regulator 24 communicates between the suction side of the pump 45 and the wheel cylinder 14, or blocks the communication between the suction side of the pump 45 and the wheel cylinder 14. In an open state, the pressure regulator 24 supplies the hydraulic oil that has been supplied to the wheel cylinder 14 in the hydraulic brake 15 for the wheel to the accumulator 25, so as to lower a hydraulic pressure. By repeatedly opening/closing the pressure regulator 24 intermittently, the flow rate of the hydraulic oil from the wheel cylinder 14 to the accumulator 25 can be regulated.

The brake electronic control unit 10 receives a signal related to a physical amount from each of a brake pedal sensor (not illustrated) that measures an operation amount of a brake pedal 11, a wheel rotational frequency sensor 18, and the pressure sensors 16, 17. Then, on the basis of the signals, the brake electronic control unit 10 controls the electromagnetic control valves and the motor 49 for driving the pump 45, supplies the hydraulic pressure to the wheel cylinder 14, and thereby causes generation of a braking force that brakes a vehicle.

A description will be made on a state of each of the electromagnetic control valves and a flow of the hydraulic oil at the time when anti-lock brake control is executed. When the brake electronic control unit 10 initiates the anti-lock control for the wheels, the booster regulator 23 is closed, and the pressure regulator 24 is opened. As a result, the hydraulic oil that has been supplied to the wheel cylinder 14 flows into the accumulator 25. According to a slip state of the wheel, the pressure regulator 24 is repeatedly and appropriately turned on/off so as to regulate the hydraulic pressure in the wheel cylinder 14. The hydraulic oil that has flowed into the accumulator 25 drives the motor 49, actuates the pump 45, and then flows back to the master cylinder 13 via the open circuit control valve 22 and the channel 32.

Next, a description will be made on the state of each of the electromagnetic control valves and the flow of the hydraulic oil at the time when brake traction control (automatic pressure boost control) is executed. When the brake electronic control unit 10 initiates the brake traction control for the wheels, the circuit control valve 22 is closed, the suction control valve 26 is opened, and the pump 45 is actuated by rotation of the motor 49. In this way, the hydraulic oil in the master cylinder 13 is supplied to the wheel cylinder 14 via the channel 31, the suction control valve 26, the pump 45, and the channel 33.

The hydraulic pressure of the hydraulic oil to be supplied to the wheel cylinder 14 is appropriately regulated by opening/closing control of the booster regulator 23 and/or the pressure regulator 24.

Description on Internal Structures of Motor and Piston Pump

A description will be made on internal structures of the motor 49 and the pump 45 with reference to FIG. 2.

A structure for holding a second bearing 67 in FIG. 2 corresponds to the related art of the invention of the present application, and another configuration can also be applied to the invention of the present application. An output rotary shaft 50 is formed with an eccentric portion 52 in one end portion that is arranged in a cylinder bore of a hydraulic block 51 in which the hydraulic circuit is installed, and also functions as an input rotary shaft of the piston pumps 45, 48.

In one of the two cylinder bores, each of which is formed in the hydraulic block 51 to have an orthogonal axis to an axis of the eccentric portion 52, a piston 53 of the piston pump 45 is arranged. In the other cylinder bore, a piston 54 of the piston pump 48 is arranged. The pistons 53, 54 are urged toward the eccentric portion 52 by springs 57, 58 arranged in pump chambers 55, 56, respectively. An inner end of each of the pistons 53, 54 abuts an outer ring of a roller bearing 59 that is assembled to an outer periphery of the eccentric portion 52.

The motor 49 has a case that is formed of: a motor housing 61 having an opening and accommodating a rotor 60 fixed to the output rotary shaft 50; and a case member 63 to which a connection terminal 62 connected to a motor drive circuit, and the like are assembled. A magnet 64 is fixed to an inner wall 61a of the motor housing 61. The motor housing 61 and the case member 63 are joined to the hydraulic block 51 by bolts 65 in a state where the case member 63 is interposed between the motor housing 61 and the hydraulic block 51. The one end portion of the output rotary shaft 50 is supported by a first bearing 66 while the other end portion thereof is supported by the second bearing 67. In FIG. 2, each of the first and second bearings 66, 67 is configured as a ball bearing.

An inner ring 68 of the first bearing 66 press-fits the output rotary shaft 50 such that an inner periphery of the inner ring 68 is fixed to the output rotary shaft 50. An outer periphery of an outer ring 69 of the first bearing 66 is supported by the hydraulic block 51 and the case member 63.

Meanwhile, an outer ring 71 of the second bearing 67 is press-fitted and fixed into a cup-shaped portion 75, and one end of the output rotary shaft 50 is fitted to an inner ring 70 of the second bearing 67.

The cup-shaped portion 75 is formed in a bottom portion 72 of the motor housing 61, and is formed by folding the bottom portion 72 of the motor housing 61 so as to be opened to an internal space of the motor housing 61.

In the structure for holding the second bearing 67 according to the related art as illustrated in FIG. 2, after the second bearing 67 is press-fitted and fixed into the inside of the cup-shaped portion 75, the output rotary shaft 50 has to be fitted to the inner ring 70 of the second bearing 67. At the time of this fitting, a press-fitting force that is applied to the inner ring 70 of the second bearing 67 is transmitted to the outer ring 71 via a rolling element of the second bearing 67, which applies a large load on the rolling element and possibly causes damage to a spherical surface of the rolling element.

In order to reduce this load by the press-fitting force, in the related art, the output rotary shaft 50 is fitted to the second bearing 67 in a state of having a certain amount of a clearance between an inner wall of the inner ring 70 of the second bearing 67 and an outer periphery of the output rotary shaft 50. Thus, the output rotary shaft 50 is not tightly fixed to the inner ring 70 of the second bearing 67, which causes a rotational frequency difference between the output rotary shaft 50 and the inner ring 70 of the second bearing 67.

Example 1

A description will be made on a first example of a motor that has a bearing holder according to the invention of the present application with reference to FIG. 3. Of the configurations of the motor described with reference to FIG. 2, the description on the same configuration will not be made.

The output rotary shaft 50 is supported by at least two points that are the first bearing 66 arranged on the side of the piston pump 45 and the second bearing 67 arranged on the side of the bottom portion 72 of the motor housing 61.

The outer ring 71 of the second bearing 67 is held by a bearing holder 80. The bearing holder 80 according to the first example is formed of a disc 85 in a substantially disc shape and a peripheral wall portion 84 that is provided perpendicularly from an outer peripheral portion of the disc 85. The disc 85 is formed with: a hole portion 82 in a substantially circular shape in a central portion thereof; and slits 83, each of which extends in a radial direction of the disc 85 from a circumference of the hole portion 82. In the bearing holder 80 illustrated in FIG. 3, six slits 83 are arranged at equally-spaced intervals.

The bearing holder 80 is press-fitted into and held in the bottom portion 72 of the motor housing 61. More specifically, in a state where an extending direction of the peripheral wall portion 84 faces downward, the bearing holder 80 is inserted in the motor housing 61. The peripheral wall portion 84 of the bearing holder 80 is formed such that a diameter 86 thereof is slightly larger than an inner diameter of the motor housing 61. Thus, the outer periphery of the peripheral wall portion 84 of the bearing holder 80 is pressed against the inner wall 61a of the motor housing 61, and the bearing holder 80 is thereby held in the motor housing 61.

In addition, the hole portion 82 of the disc 85 is formed to have a slightly smaller diameter than the second bearing 67. Thus, when the second bearing 67 is pushed into the hole portion 82 of the bearing holder 80, a blade portion 81 of the disc 85 is bent downward, and, with an elastic repulsive force of the blade portion 81 generated by such bending, a tip 81a of the blade portion 81 presses an outer periphery of the second bearing 67 inward. As a result, the second bearing 67 is held in the bottom portion 72 of the motor housing 61 by the bearing holder 80.

In the state where the second bearing 67 is held by the bearing holder 80, as illustrated in FIG. 3, the blade portion 81 of the bearing holder 80 has an inclined portion 81b that is inclined with respect to a surface of the bottom portion 72 of the motor housing 61.

Example 2

A description will be made on a second example of the motor that has the bearing holder according to the invention of the present application with reference to FIG. 4. Of the configurations of the motor described with reference to FIG. 2 and FIG. 3, the description on the same configuration will not be made.

The second bearing 67 is arranged in the bottom portion 72 of the motor housing 61, and the outer ring 71 of the second bearing 67 is held by a bearing holder 90. The bearing holder 90 according to the second example is configured to include: a disc 91 that substantially has a donut shape and has a hole portion 94 at a center thereof; an outer peripheral wall portion 92a that extends perpendicularly to a surface of the disc 91 from an outer peripheral portion 92 of the disc 91; and an inner peripheral wall portion 93a that extends perpendicularly to the surface of the disc 91 from an inner peripheral portion 93 of the disc 91. In the inner peripheral wall portion 93a, slits 95 are arranged at equally-spaced intervals along a circumference.

The bearing holder 90 is press-fitted into and held in the bottom portion 72 of the motor housing 61. More specifically, in a state where extending directions of the outer peripheral wall portion 92a and the inner peripheral wall portion 93a face upward in FIG. 4, the bearing holder 90 is inserted in the motor housing 61. The outer peripheral wall portion 92a of the bearing holder 90 is formed such that a diameter thereof is slightly larger than the inner diameter of the motor housing 61. Thus, an outer periphery of the outer peripheral wall portion 92a of the bearing holder 90 is pressed against the inner wall 61a of the motor housing 61, and the bearing holder 90 is thereby held in the motor housing 61. In addition, similar to an inner peripheral portion 72a of the bottom portion 72 of the motor housing 61, an outer surface 92b at a position where the outer peripheral wall portion 92a is vertically provided may be chamfered. As a result, the bearing holder 90 can acquire a sufficient holding force from the inner peripheral portion and the bottom portion 72 of the motor housing 61.

In addition, the hole portion 94 of the disc 91 is formed such that an inner diameter thereof is slightly smaller than the diameter of the second bearing 67. Thus, when the second bearing 67 is pushed into the hole portion 94 of the bearing holder 90, the inner peripheral wall portion 93a is slightly bent to an outer side of the disc 91, and, with a repulsive force that is generated by such bending and attempts to return the inner peripheral wall portion 93a inward, the inner peripheral wall portion 93a presses the outer periphery of the second bearing 67 inward. As a result, the second bearing 67 is held in the bottom portion 72 of the motor housing 61 by the bearing holder 90.

Instead of the above, a mechanical that holds the second bearing 67 in the inner peripheral wall portion 93a while setting the inner diameter of the hole portion 94 of the disc 91 to be the same as the diameter of the second bearing 67 may be provided. More specifically, such a structure may be adopted that a small projected portion (not illustrated) crushed at the time when the bearing is inserted in the inner peripheral wall portion is provided and, after the bearing is inserted, the bearing is held by a pressing force of the projected portion.

In the second example, the effect of the invention can be exerted even when the hole portion 94 is not provided.

Manufacturing Method of Motor

S1: Attach the second bearing 67 to the output rotary shaft 50.
S2: Attach the rotor 60 to the output rotary shaft 50.
S3: Attach the case member 63 to the output rotary shaft 50.
S4: Attach the first bearing 66 to the output rotary shaft 50.
S5: Attach the roller bearing 59 to the eccentric portion 52 of the output rotary shaft 50.
S6: Attach the bearing holder 80 or 90 to the motor housing 61.
S7: Attach the magnet 64 to the motor housing 61.
S8: Attach an assembly 1 to an assembly 2.

A description will hereinafter be made on a manufacturing method of the motor according to the invention of the present application with reference to FIG. 5. The manufacturing method of the motor includes a step of processing each component, a step of winding a coil, and the like. However, a description will herein be made only on a step of assembling each of the components or each assembled component according to characteristics of the present invention. A known method can be adopted for other steps related to manufacturing of the motor.

In manufacturing step S1, attachment work of the second bearing 67, which is arranged in the bottom portion 72 of the motor housing 61, to the output rotary shaft 50 is performed. More specifically, the output rotary shaft 50 is press-fitted into the inner ring 70 of the second bearing 67, so as to fix the second bearing 67 to the output rotary shaft 50.

In manufacturing step S2, attachment work of the rotor 60 to the output rotary shaft 50 is performed. For example, a shrink-fit jig is used to fit the output rotary shaft 50 to a shaft hole provided in the rotor 60 in an inserted state of the output rotary shaft 50 in the shaft hole.

In manufacturing step S3, the case member 63 that includes a drive unit of the motor 49 is attached to the output rotary shaft 50.

In manufacturing step S4, the first bearing 66 that is arranged on the side of the piston pumps 45, 48 is attached to the output rotary shaft 50. More specifically, the output rotary shaft 50 is press-fitted into the inner ring 68 of the first bearing 66, so as to fix the first bearing 66 to the output rotary shaft 50.

In manufacturing step S5, the roller bearing 59 is attached to the eccentric portion 52 of the output rotary shaft 50. More specifically, the eccentric portion 52 is press-fitted into an inner ring of the roller bearing 59, so as to fix the roller bearing 59 to the output rotary shaft 50.

By executing manufacturing steps S1 to S5, the assembly of the components attached to the output rotary shaft 50 is finished. A semi-finished product that is assembled in manufacturing steps S1 to S5 will be set as the assembly 1.

After manufacturing step S5 is terminated, or in parallel with manufacturing steps S1 to S5, manufacturing step S6 is executed. In manufacturing step S6, the bearing holder 80 or 90 is attached to the motor housing 61. As it has already been described, each of the bearing holders 80, 90 is press-fitted and fixed into the motor housing 61 so as to be held by the inner wall 61a of the motor housing 61.

In manufacturing step S7, the magnet 64 that functions as a stator of the motor 49 is attached to the motor housing 61. The attachment of the magnet 64 may be achieved through fitting including plastic deformation or by adhesion of the magnet 64 to the inner wall 61a of the motor housing 61 using an adhesive.

By manufacturing steps S6 to S7, the assembly of the components attached to the motor housing 61 is finished. A semi-finished product that is assembled in manufacturing steps S6 to S7 will be set as the assembly 2.

In manufacturing step S8, attachment work of the assembly 1 to the assembly 2 is performed. The second bearing 67 that is attached to the one end of the output rotary shaft 50 is fitted to the hole portion 82 or 94 of the bearing holder 80 or 90, the second bearing 67 is press-fitted to a specified position on the side of the bottom portion 72 of the motor housing 61, and the second bearing 67 is thereby press-fitted and fixed into the bearing holder 80 or 90. At the same time, the case member 63 covers an opening of the motor housing 61, and the case member 63 is joined to a flange in the opening of the motor housing 61 by a screw or the like.

In the motor and the manufacturing method thereof according to the invention of the present application, before the output rotary shaft 50 is attached to the motor housing 61, the second bearing 67 can press-fit and be fixed to the output rotary shaft 50 in advance. Compared to the case where the output rotary shaft 50 and the second bearing 67 are fitted to each other while having the clearance therebetween, it is possible to suppress generation of creep noise. In addition, the special processing to form a cup-shaped portion in the bottom portion of the motor housing in order to hold the second bearing 67 as in the related art is unnecessary. Thus, it is possible to provide the motor structure capable of supporting the output rotary shaft 50 simply by press-fitting and fixing the bearing holder into the motor housing 61.

REFERENCE SIGNS LIST

10: Brake electronic control unit
45, 48: Piston pump
49: Motor
52: Eccentric portion
59: Roller bearing
60: Rotor
61: Motor housing
63: Case member
64: Magnet
66: First bearing
67: Second bearing
80, 90: Bearing holder

The invention claimed is:

1. A motor (49) that drives piston pumps (45, 48), the motor comprising:
a motor housing (61);
an output rotary shaft (50);
a first bearing (66) that supports the output rotary shaft (50) and is arranged at a first end of the output rotary shaft (50) on a piston pump side;
a second bearing (67) that supports one end of the output rotary shaft (50) and is arranged on a side of a bottom portion (72) of the motor housing (61) at a second end of the output rotary shaft (50) opposite from the first end; and a bearing holder (80, 90) that is held by an inner wall of the motor housing (61) so as to hold the second bearing (67), the bearing holder (80, 90) having a disc in a disc shape and a peripheral wall portion (84, 92) that is vertically provided in an outer peripheral portion of the disc and is pressed against the inner wall of the motor housing (61), the bearings holder (90) including an inner peripheral wall portion (93*a*) that is vertically provided on an inner peripheral side of the outer peripheral portion of the disc so as to hold the second bearing (67), and wherein in the inner peripheral wall portion (93*a*), slits (95) are arranged at equally-spaced intervals along a circumference.

2. The motor according to claim 1, wherein the bearing holder (80, 90) includes a hole portion (82, 94) that has a smaller diameter than the second bearing (67).

3. The motor according to claim 2, wherein the bearing holder (80) has a slit (83) that extends radially from the hole portion (82).

4. A motor comprising:
a motor housing (61) that has an opening and accommodates a rotor fixed to an output rotary shaft (50);
a first bearing (66) that supports the output rotary shaft (50) and is arranged at a first end of the output rotary shaft (50) on an opening side;
a second bearing (67) that supports one end of the output rotary shaft (50) and is arranged in a bottom portion (72) of the motor housing (61) at a second end of the output rotary shaft (50) opposite from the first end; and
a bearing holder (80, 90) that is held by an inner wall of the motor housing (61) so as to hold the second bearing (67), the bearing holder (80, 90) having a disc in a disc shape and a peripheral wall portion (84, 92) that is vertically provided in an outer peripheral portion of the disc and is pressed against the inner wall of the motor housing (61), the bearing holder (90) including an inner peripheral wall portion (93*a*) that is vertically provided on an inner peripheral side of the outer peripheral portion of the disc so as to hold the second bearing (67), and wherein in the inner peripheral wall portion (93*a*), slits (95) are arranged at equally-spaced intervals along a circumference.

5. A method for manufacturing a motor in which an output rotary shaft (50) of a motor (49) driving a piston pump is at least supported by two points that are a first bearing arranged at a first end of the output rotary shaft (50) on a piston pump side and a second bearing (67) arranged on a bottom portion side of a motor housing (61) at a second end of the output rotary shaft (50) opposite from the first end, the method comprising:
press-fitting and fixing the output rotary shaft (50) into the second bearing (67);
press-fitting and fixing a bearing holder (80, 90) that holds the second bearing (67) into the motor housing (61); and
press-fitting and fixing the second bearing (67) that has press-fitted and fixed the output rotary shaft (50) therein into the bearing holder (80, 90),
wherein the bearing holder (80, 90) has a disc in a disc shape and a peripheral wall portion (84, 92) that is vertically provided in an outer peripheral portion of the disc and is pressed against the inner wall of the motor housing (61), the bearing holder (90) including an inner peripheral wall portion (93*a*) that is vertically provided on an inner peripheral side of the outer peripheral portion of the disc so as to hold the second bearing (67), and
wherein in the inner peripheral wall portion (93*a*), slits (95) are arranged at equally-spaced intervals along a circumference.

\* \* \* \* \*